United States Patent Office 3,076,805
Patented Feb. 5, 1963

---

3,076,805
NEW 1-(HYDROXY(LOWER)ALKYL) - 3 - (5-NITRO-FURFURYLIDENEAMINO) - 2 - IMIDAZOLIDINE-THIONES
Julian G. Michels, Norwich, N.Y., assignor to The Norwich Pharmacal Company
No Drawing. Filed Feb. 26, 1962, Ser. No. 175,822
3 Claims. (Cl. 260—240)

This invention relates to new chemical compounds which are 1-(hydroxy(lower)alkyl)-3-(5-nitrofurfurylidene-amino)-2-imidazolidinethiones, represented by the formula:

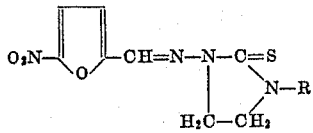

wherein R represents an hydroxy(lower)alkyl radical selected from the group consisting of hydroxymethyl and 2-hydroxyethyl.

This application is a continuation-in-part of, and is filed as a substitute for, my copending applications, Serial Nos. 848,199 and 848,201, each filed on October 23, 1959, and now abandoned.

I have discovered that my new compounds are distinguished by extraordinary systemic chemothermapeutic activity when administered in far less than toxic amount to animals lethally infected with pathogenic microorganisms. Systemic infections provoked by *Salmonella typhosa*, *Eimeria tenella*, *Salmonella gallinarum* and *Staphylococcus aureus* are successfully combatted by my compounds. Particularly impressive and surprising is the therapeutic result obtained through the use of my compounds in the treatment of antibiotic resistant *Staphylococcus aureus* infections. My compounds, when administered in a single dose of from about 52.5 to 105 mg./kg. to mice lethally infected with that organism, cause survival of from about 50% to 90%. Also noteworthy is the ability of my compounds to combat fowl typhoid, caused by *Salmonella gallinarum*, when administered perorally at a level of 0.022% by weight of the diet of chickens affected with that disease.

My compounds may be prepared easily from readily procurable starting materials. The nature of the hydroxyalkyl radical dictates to a large degree the reactions and reactants used to obtain them.

In the case of 1-hydroxymethyl-3-(5-nitrofurfurylidene-amino)-2-imidazolidinethione, the method which I prefer consists in simply refluxing an aqueous formaldehyde solution of 1-(5-nitrofurfurylideneamino)-2-imidazolidinethione; filtering any undissolved material; cooling; and collecting the deposited solid by filtration.

In the case of 1-(2-hydroxyethyl)-3-(5-nitrofurfurylideneamino)-2-imidazolidinethione, the method which I prefer consists in nitrosating 1-(2-hydroxyethyl)-2-imidazolidenethione; reducing the nitroso compound to its amino counterpart by the action of a metal, such as zinc, in acid solution; and condensing the amino compound with 5-nitro-2-furfural.

My compounds may be readily compounded and formulated in accordance with accepted pharmaceutical practice in various dosage forms such as tablets, powders, elixirs, solutions, suspensions, capsules and the like, using compatible excipients and carriers to provide convenient and readily dispensed chemotherapeutic compositions. In the veterinary art, the feed and drinking water of animals and poultry serve as readily available and convenient carriers for my compounds.

In order that my invention may be readily available to those skilled in the art, the following illustrative examples of the preparation of my new compounds are briefly described.

EXAMPLE I

*1-Hydroxymethyl-3-(5-Nitrofurfurylideneamino)-2-Imidazolidinethione*

A mixture of 10 gm. of 1-(5-nitrofurfurylideneamino)-2-imidazolidinethione and 1 liter of 5% formaldehyde is refluxed for about 5 minutes. Any excess of starting material is filtered from the hot mixture and the clear filtrate allowed to cool whereupon crystals are deposited. These crystals (7 gm.) may be recrystallized, if desired, from a 5% aqueous formaldehyde solution to yield 5 gm. of 1-hydroxymethyl - 3 - (5 - nitrofurfurylideneamino)-2-imidazolidinethione monohydrate. This hydrate upon drying at 60° C. in vacuo for a short period of time or for longer periods at about 100° C. at atmospheric pressure loses about 5.75–6.0% of its weight to yield anhydrous 1-hydroxymethyl-3-(5 - nitrofurfurylideneamino)-2-imidazolidinethione (M.P. ca. 175 with decomposition upon rapid heating) whose elemental analysis is:

|  | Calculated, percent | Found, percent |
|---|---|---|
| Carbon | 39.99 | 39.90 |
| Hydrogen | 3.73 | 3.91 |
| Sulfur | 11.86 | 11.68 |

EXAMPLE II

*1-(2-Hydroxyethyl)-3-(5-Nitrofurfurylideneamino)-2-Imidazolidinethione*

To a mixture of 1-(2-hydroxyethyl)-2-imidazolidinethione, 48.3 gm. (0.33 m.), 350 cc. of dioxane, and 130 cc. of 2 N sulfuric acid is added a solution of sodium nitrite (22.7 gm. in 65 cc. of water) at —1 to —6° C. over a period of 32 minutes. The mixture is stirred at —2 to +2° C. for about 50 minutes. To the mixture is added 725 cc. of 2 N sulfuric acid at ±2° C. Zinc dust (45.0 gm.) is added at —2 to —4° C. over a period of 13 minutes, followed by stirring at ±3° C. for 22 minutes. The cloudy solution is filtered and 5-nitro-2-furaldehyde (34.8 gm. dissolved in 110 cc. of methanol) is added to the filtrate. A yellow crystalline solid is deposited. The mixture is cooled, the solid collected and washed well with water, alcohol, and ether. The crude product, 73 gm. (78%), M.P. 181–184° C., may be recrystallized, if desired, from nitromethane. So recrystallized the product, 53 gm. (56%), melts at 189–192° C.

|  | Calculated, percent | Found, percent |
|---|---|---|
| Carbon | 42.25 | 42.31 |
| Hydrogen | 4.22 | 4.48 |
| Sulfur | 11.28 | 11.17 |

What I claim is:
1. The compounds of the formula:

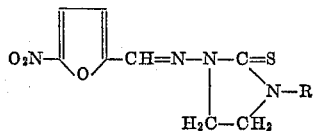

wherein R represents an hydroxy (lower) alkyl radical selected from the group consisting of hydroxymethyl and 2-hydroxyethyl.

2. 1-hydroxymethyl-3-(5 - nitrofurfurylideneamino)-2-imidazolidinethione.

3. 1-(2-hydroxyethyl)-3-(5 - nitrofurfurylideneamino)-2-imidazolidinethione.

References Cited in the file of this patent

UNITED STATES PATENTS

| 2,742,462 | Gever | Apr. 17, 1956 |
| 2,746,960 | Gever et al. | May 22, 1956 |
| 2,920,074 | Michels | Jan. 5, 1960 |